United States Patent [19]

Pichant

[11] Patent Number: 4,701,382

[45] Date of Patent: Oct. 20, 1987

[54] LIQUID COATING COMPOSITION CONTAINING LUBRICANTS

[75] Inventor: Patrick Pichant, Senlis, France

[73] Assignee: Akzo N.V., Netherlands

[21] Appl. No.: 713,965

[22] Filed: Mar. 20, 1985

[30] Foreign Application Priority Data

Mar. 22, 1984 [NL] Netherlands ............... 8400903

[51] Int. Cl.$^4$ .................. B32B 15/04; B05D 3/02
[52] U.S. Cl. .................. 428/457; 427/385.5; 427/386; 252/511; 252/518
[58] Field of Search ........... 252/511, 500, 54, 58, 252/518; 427/385.5; 428/457, 386

[56] References Cited

U.S. PATENT DOCUMENTS

| | | | |
|---|---|---|---|
| 2,709,664 | 5/1955 | Evans | 427/386 |
| 2,964,476 | 12/1960 | Coad | 252/511 X |
| 3,473,087 | 10/1969 | Slade | 252/511 X |
| 4,076,652 | 2/1978 | Ganci et al. | 252/504 |
| 4,157,924 | 6/1979 | Elms et al. | 148/6.2 |
| 4,161,409 | 7/1979 | Schiffman | 106/14.21 |
| 4,296,176 | 10/1981 | Lennon et al. | 252/511 X |
| 4,391,855 | 7/1983 | Geeck | 427/383.7 |
| 4,482,476 | 11/1984 | Yoshimura et al. | 252/511 |
| 4,515,830 | 5/1985 | DiMarco | 252/511 X |
| 4,608,282 | 8/1986 | Runge | 427/385.5 |
| 4,615,917 | 10/1986 | Runge | 427/385.5 |
| 4,628,004 | 12/1986 | Nickola et al. | 427/388.1 X |

FOREIGN PATENT DOCUMENTS 1481467 7/1977 United Kingdom .

OTHER PUBLICATIONS

General Motors Engineering Standards, Apr. 1978, pp. W-23401-23402.

Primary Examiner—Thurman K. Page
Attorney, Agent, or Firm—Jeffrey S. Boone

[57] ABSTRACT

A new liquid coating composition contains a binder (such as a phenoxy resin), an electrically conductive pigment (such as zinc dust), and at least two solid, powdered lubricants, at least one of the lubricants being an inorganic lubricant (such as molybdenum disulphide). These coating compositions are useful for coating metal substrates, particularly where the metal substrate is to be deformed (such as by stamping) and/or welded.

13 Claims, No Drawings

LIQUID COATING COMPOSITION CONTAINING LUBRICANTS

BACKGROUND OF THE INVENTION

The invention relates to a liquid coating composition based on a binder and an electrically conductive pigment in an amount of at least 30 percent by volume, calculated on the pigment and binder. Coating compositions of this type are applied to metal substrates, such as metal strip and especially steel strip and impart corrosion inhibiting properties to the metal and the high content of electrically conductive pigment renders the metal weldable. The metal substrate thus provided with such a coating is generally deformed by a non-cutting process, for instance by pressing. But there is the chance that the coating will be flaked off and destroyed, which has a detrimental effect on corrosion inhibiting protection. An additional disadvantage is the contamination of shaping tools, so that production must be interrupted after every 50 or 100 pressing operations to clean the equipment, because soiled equipment will cause undesirable surface depressions in the metal. According to British Patent Specification GB No. 1,481,467, this drawback, which is a major problem in, for example, the automobile industry, is met by applying to the coating another coating composed of 50–70% by weight of a substance promoting sliding and 50–30% by weight of an organic binder. A disadvantage to that method, however, is that production is detrimentally affected and additional capital expenditure is required.

SUMMARY OF THE INVENTION

Surprisingly, it has now been found, according to the invention, that by adapting the coating composition itself, i.e., without additional capital outlay or detrimental effect on production, the coated metal substrate will remain excellently weldable and keep its corrosion inhibiting property, while the workability of the substrate will be greatly enhanced.

In one aspect, the invention is a coating composition characterized in that the coating composition contains at least 2 solid, powdered lubricants in a total amount of 0.05–5 percent by weight, calculated on the coating composition (including solvent, if present), at least one of them being an inorganic lubricant.

In another aspect, the invention is a method of coating a metal substrate wherein the aforementioned coating composition is applied to a metal substrate and cured.

In yet another aspect, the invention is a coated metal substrate produced according to the preceding method.

DETAILED DESCRIPTION

In this specification and claims, numerical ranges are not critical unless otherwise stated. That is, the numerical ranges may be read as if they were prefaced with the word "about" or "substantially".

The composition according to the invention may contain any usual binder, such as a hydroxyl group-containing resin. Representative binders include compounds containing at least 1 epoxy group, such as epoxy resins and phenoxy resins, which may optionally be mixed with one or more other resins.

Examples of suitable solid or liquid epoxy resins include glycidyl groups-containing resins such as polyacrylic resins, polyesters, polyethers or polyurethanes, which all contain one or more glycidyl groups per molecule. Representative epoxy resins include compounds of the following general formula:

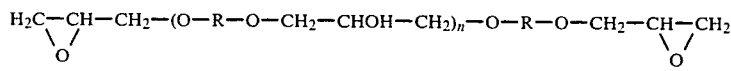

wherein R represents an aliphatic, cycloaliphatic or aromatic group and n is a number in the range of from 0 to 50, preferably 0 to 10; or an adduct thereof with a (cyclo)aliphatic or heterocyclic diamine, preferably a di-secondary amine, such as piperazine. Examples of such epoxy resins include the glycidyl ethers of ethylene glycol, diethylene glycol, triethylene glycol, 1,2-propylene glycol, 1,3-propylene glycol, 1,5-pentane diol, bis-(4-hydroxycyclohexyl)-2,2-propane, 4,4'-dihydroxybenxophenone, bis-(4-hydroxyphenyl)methane, bis(4-hydroxyphenyl)-1,1ethane, bis-(4-hydroxyphenyl)-1,1-isobutane and 1,5-dihydroxynaphthalene. If desired, use may be made of polyglycidyl ethers of compounds such as glycerol or 1,2,3-hexane triol. More particularly, it is preferred that use should be made of a diglycidyl ether based on bis-(4-hydroxyphenyl)-2,2-propane. Use also may be made of mixtures of epoxy resins.

Suitable phenoxy resins include, for instance, phenoxy resins available under the trademarks Phenoxy PKHC and Phenoxy PKHH of Union Carbide. These last-mentioned resins are cured by drying. Epoxy resins having a relatively low molecular weight may be cured with the aid of, for instance, suitable polyamines, amides, polyaminoamides and blocked or non-blocked polyisocyanates or aminoplasts.

Other examples of suitable binders include polyacrylate resins, nitrocellulose, epoxy esters and block copolymers of the formula $A—(B—A)_m$ or $B—(A—B)_n$, wherein m and n are numbers in the range of from 1 to 20, and built up of one or more blocks A of a carboxylic polyester resin from terephthalic acid and/or isophthalic acid and a difunctional hydroxy compound and having an acid number of 10–140 and a number average molecular weight of 800–10,000, and of one or more blocks B of an epoxy resin having an epoxy functionality of 1.5–2.5 and an epoxy equivalent weight of 100–2,000.

Examples of suitable curing agents for the hydroxy group-containing polymer include blocked or non-blocked isocyanurate compounds or blocked or non-blocked aliphatic, cycloaliphatic or aromatic, di-, tri- or polyvalent isocyanates. Examples of suitable isocyanates include hexamethylene diisocyanate, 2,2,4-trimethyl-1,6-hexane diisocyanate, 2,4,4-trimethyl-1,6-hexane diisocyanate, cyclohexyl-1,4-diisocyanate, isophoron diisocyanate, the adduct of 1 molecule of 1,4-butane diol and 2 molecules of isophorondiisocyanate, the adduct of 1 molecule of 1,4-butane diol and 2 molecules of hexamethylene diisocyanate, dicyclohexylmethane-4,4'diisocyanate, xylylene diisocyanate, 1,3,5-trimethyl-(2,4-ω-diisocyanatomethyl)benzene, toluene diisocyanate, diphenylmethane-4,4'-diisocyanate, the adduct of 3 molecules of hexamethylene diisocyanate and 1 molecule of water, the adduct of 1 molecule of trimethylol propane and 3 molecules of isophoron diisocyanate, the adduct of 1 molecule of trimethylol propane and 3 molecules toluene diisocyanate and the adduct of 1 molecule of pentaerythritol and 4 molecules of hexamethylene diisocyanate. For blocking the isocyanate or isocyanurate compound, if required, use may be made of any conventional or suitable blocking agent Instead of or in addition to the above-described curing agents, other suitable agents that may be used are, for example, N-methylol groups-and/or N-methylol ether groups-containing aminoplasts obtained by reaction of an aldehyde, such as formaldehyde, with an amino groups- or amido groups-containing compound, such as melamine, urea, N-N'-ethylene urea, dicyandiamide and benzoguanamine; for the preparation of these compounds see, for example, Houbel-Weyl, Methoden der organischen Chemie; Vol. 14/2, pp. 319-371 (1963). It is preferred that these compounds should entirely or partly be etherified with alcohols having 1 to 6 carbon atoms, for instance with methanol, ethanol, n-propanol, isopropanol, n-butanol, isobutanol, amyl alcohol, hexanol or mixtures of the above-envisaged alcohols. More particularly, use is made of a methylol melamine having 4 to 6 methylol groups per molecule of melamine, with at least 3 methylol groups being etherified with methanol, ethanol, a propanol or with a butanol, or a butanol-etherified condensation product of formaldehyde and N,N'-ethylene diurea.

The coating composition also contains an electrically conductive pigment in an amount of at least 30, and preferably at least 50 percent by volume, calculated on the combined volume of the pigment and the binder. Examples of suitable electrically conductive pigments include micaceous iron oxide, iron phosphide, magnetite, gas black or furnace carbon black. It is preferred that the electrically conductive pigment used should be a metal, for instance: aluminum, copper, steel, stainless steel, cadmium and particularly zinc. Use also may be made of mixtures of 2 or more electrically conductive pigments, for instance a mixture of zinc and aluminum. The zinc may be applied in any finely divided form, for instance as zinc dust or as flakes.

According to the invention, the coating composition contains a mixture of at least 2 solid, powdered lubricants, at least one of them being an inorganic lubricant, and preferably there being at least one inorganic lubricant and at least one organic lubricant.

Examples of suitable inorganic lubricants include metal compounds such as molybdenum disulphide, tungsten disulphide, lead disulphide and compounds such as graphite. A preferred inorganic lubricant is a heavy metal sulphide and more particularly molybdenum disulphide. According to the invention, the inorganic lubricant is contained in the coating composition in an amount of generally 0.05-5% by weight, preferably 0.38-3.1% by weight, and more preferably of 0.1-1.9% by weight, calculated on the coating composition.

Examples of suitable organic lubricants include polytetrafluoroethene and polytrifluoroethene. Preferably, use is made of a polytetrafluoroethene having a number average molecular weight of 35,000-100,000 and an average particle size of 0.1-40μm (diameter). According to the invention, the organic lubricant is contained in the coating composition in an amount of preferably not higher than 3% by weight, preferably 0.01-1.9% by weight, more preferably 0.1-0.8% by weight, based on the coating composition.

A particularly preferred mixture of lubricants is a mixture of molybdenum disulphide and polytetrafluoroetnene.

According to the invention, the total amount of lubricant contained in the coating composition is 0.05-5% by weight, preferably 0.1-2.7% by weight, and more preferably 0.3-2% by weight, based on the total coating composition (including solvent and optional ingredients, if present). The lubricants may be combined with each other and with the other components of the coating composition in any suitable manner. For instance, the lubricants may first be mixed with each other and the resulting mixture be added to the binder or a solution thereof.

The coating composition generally contains an organic solvent for the binder. As examples of suitable solvents may be mentioned ethyl glycol acetate, isophorone, methyl isobutyl ketone or mixtures, optionally with hydrocarbons such as toluene or xylene.

The coating composition may optionally contain other additives, such as anti-sag agents, levelling agents, pigment dispersing agents, dyes, non-conductive pigments, and corrosion inhibiting agents.

The coating composition may be applied to the substrate in any suitable manner, conveniently by roller coating or spraying. Applicable coating thicknesses are generally in the range of 1-60 μm, preferably 5-25 μm. The substrate used is generally of a pretreated or non-pretreated metal or alloy, such as iron, steel, tin plate, galvanized iron; or of iron or steel, plated in some other way with a coating of zinc or alloy copper or aluminum; preferably use is made of an iron or steel substrate, which is usually in the form of a sheet. Optionally, the metal substrate may have been pretreated, for instance: phosphated or chromated.

The coating composition may be cured or baked in the usual manner. When the coating composition is used in coil coating, it is cured at a temperature of, for instance, about 100°-280° C., which is the usual final curing temperature of the substrate; that temperature could, as a rule, only be obtained by contacting the coated substrate for a short time (for instance: 10-90 seconds) with air or combustion gases at a temperature of 250°-400° C. The application and coating conditions used in the case of coil coatings are well known to one skilled in the art and require no further description here. For other fields of application, use may be made of different temperature ranges. The substrate thus coated may optionally still be top-coated.

In the following examples, which give a further description of the invention but are not to be construed as a limitation thereon, the adhesion of the cured coating is measured with a lubricant tester of the Detroit Testing Machine Co., in which the test panel is drawn twice through a die in such a way that the panel undergoes an elongation of 44%. Prior to the drawing procedure, the test panels are provided with a film of lubricating oil. When the coating is found not to be visibly damaged, the adhesion is rated as "good"; in the case where more than 1% of the coating is removed, the adhesion is "poor", and between these two extremes the adhesion is rated as "moderate" (see General Motors Engineering Standards, April 1978, pp. W-23401-23402).

EXAMPLE 1

To a coating composition made up of 8 parts by weight of a phenoxy resin (available under the trademark Phenoxy PKHH of Union Carbide), 52 parts by weight of zinc dust (equivalent to 50% by volume based on the combined volume of the pigment and binder), and 40 parts by weight of ethyl glycol acetate, there is added a mixture of 0.2 parts by weight of molybdenum disulphide and 0.2 parts by weight of polytetrafluoroethene.

For comparison, to an identical coating composition, 0.4 parts by weight of molybdenum disulphide are added, and to another identical coating composition, no lubricant is added at all.

The compositions were roller coated onto steel panels to a coating thickness of 14 μm (in the cured state) and cured by leaving the panels in an oven for 25–35 seconds at a temperature of 300°–400° C., so that the maximum temperature of the panels was about 260° C. The adhesion measured is given in the table below.

TABLE

| Examples | Adhesion |
| --- | --- |
| Example 1 | Good |
| Control (without lubricant) | Poor |
| Composition containing 0.4 parts by weight of molybdenum disulphide | Moderate |

I claim:

1. A liquid coating composition based on a binder and an electrically conductive pigment in an amount of at least 30 percent by volume, calculated on the pigment and binder, characterized in that the coating composition contains at least 2 solid, powdered lubricants in a total amount of 0.05–5 percent by weight, calculated on the coating composition, at least one of them being an inorganic lubricant.

2. The coating composition of claim 1, characterized in that the inorganic lubricant is a heavy-metal disulphide.

3. The coating composition of claim 2, characterized in that the heavy-metal sulphide is molybdenum disulphide.

4. The coating composition of claim 1, characterized in that the inorganic lubricant is present in an amount of 0.08–3.1% by weight, calculated on the coating composition.

5. The coating composition of claim 4, characterized in that the inorganic lubricant is present in an amount of 0.1–1.9% by weight, calculated on the coating composition.

6. The coating composition of claim 1, characterized in that it contains an organic lubricant.

7. The coating composition of claim 6, characterized in that the organic lubricant is a polytetrafluoroethene having a number average molecular weight of 35,000–100,000 and an average particle size in the range of from 0.1 to 40 μm.

8. The coating composition of claim 6 or 7, characterized in that the organic lubricant is present in an amount of 0.2–1.9% by weight, calculated on the coating composition.

9. The coating composition of claim 8, characterized in that the corganic lubricant is present in an amount of 0.1–0.8% by weight, calculated on the coating composition.

10. The coating composition of claim 1, characterized in that the lubricants are molybdenum disulphide and polytetrafluoroetnene.

11. The coating composition of claim 1 wherein the conductive pigment is a metal.

12. A coated metal substate comprising a metal substrate onto which the coating of claim 1 has been applied and cured.

13. The coated metal substrate of claim 12 wherein the metal substrate has been deformed subsequent to the curing of the coating.

* * * * *